US007914056B1

(12) United States Patent  
Peterman

(10) Patent No.: US 7,914,056 B1  
(45) Date of Patent: Mar. 29, 2011

(54) REMOVING UTENSIL FOR SOLID WASTE DEPOSITED BY A SMALL ANIMAL

(76) Inventor: Steven A. Peterman, Marina Del Rey, CA (US)

( * ) Notice: Subject to any disclaimer, the term of this patent is extended or adjusted under 35 U.S.C. 154(b) by 0 days.

(21) Appl. No.: 12/708,992

(22) Filed: Feb. 19, 2010

(51) Int. Cl.  
*A01K 29/00* (2006.01)  
*E01H 1/12* (2006.01)

(52) U.S. Cl. ........................................ 294/1.3; 294/55.5

(58) Field of Classification Search .................. 294/1.3, 294/1.4, 55, 55.5, 5.5; 56/400.16, 400.21; 362/119, 120  
See application file for complete search history.

(56) References Cited

U.S. PATENT DOCUMENTS

| | | | | |
|---|---|---|---|---|
| 2,130,472 | A | * | 9/1938 | Rorabaugh ..................... 294/51 |
| 3,310,332 | A | * | 3/1967 | Nelson .......................... 294/55.5 |
| 5,360,071 | A | * | 11/1994 | Bergendorf ................... 172/378 |
| 5,562,318 | A | | 10/1996 | McBroom |
| 5,741,036 | A | | 4/1998 | Ring |
| D405,564 | S | * | 2/1999 | Martin ......................... D30/162 |
| 6,003,913 | A | * | 12/1999 | Flumiani ....................... 294/1.4 |
| 6,869,118 | B2 | | 3/2005 | Bradford |
| 7,431,361 | B2 | | 10/2008 | Pilas |
| 7,484,859 | B1 | * | 2/2009 | Burke .......................... 362/120 |
| 2009/0090309 | A1 | | 4/2009 | Scott |

OTHER PUBLICATIONS

Innovative Pet Solutions, Opposable Scoops to Pickup Any Fecal Type, http://kakaking.com/s3_gallery.htm (Nov. 13, 2009 internet download).  
Blue Ribbon Scooper, Pooper Scooper, http://poop-scoop.usalocalmall.com/buy/shopdisplayproducts.asp?id=8&cat=Pooper+Scooper (Nov. 13, 2009 internet download).

* cited by examiner

*Primary Examiner* — Dean J Kramer  
(74) *Attorney, Agent, or Firm* — Howard Leslie Hoffenberg; IP and Business Law Offices of Howard L. Hoffenberg, Esq.

(57) ABSTRACT

A removing utensil for solid waste deposited by a small animal comprised of a support; a plurality of elongated members that extend from the support that form a removing surface; a pair of elongated members having distal sections that obliquely face away from positioned superior to the removing surface whereby solid waste is funneled unto the removing surface; a handle assembly comprised of a handle member and a projector of a beam of light and a bracket that extends from the support having first leg in the plane of the removing surface and second leg that connects to the handle assembly which is shaped so that a projected beam of light illuminates the removing surface and an area forward.

17 Claims, 6 Drawing Sheets

REMOVING UTENSIL FOR SOLID WASTE DEPOSITED BY A SMALL ANIMAL

BACKGROUND OF THE INVENTION

1. Field of the Invention

This invention pertains approximately to sanitary handlers for pet droppings and more particularly to removing utensils for deposited solid waste.

2. Related Art

It is commonplace to have a small animal as a pet and in particular, a dog. It is also commonplace to have the dog relieve her/himself by taking the dog for a walk, letting the dog roam in a yard or letting the dog roam in a dog run. After the dog relieves her/himself, it is good practice and/or required by law that solid waste deposited by the dog be removed. The waste is unsightly, can smell and be a breading ground for insects and bacteria.

U.S. Pat. No. 5,562,318 to McBroom is entitled "Animal Waste Collector" and known in the art. This patent teaches a broom style instrument having an elongated handle. At the base of the elongated handle there is a row of perpendicularly extending rods that form a holding surface. The distal sections of these rods are obliquely angled upward so as to form a collecting surface (as explained below, the collector is tilted forward to pick-up waste.) At the marginal edges of the holding surface, there are a pair of side rods that function as sidewalls and these side rods do not extend over the collecting surface. To use the collector, the handle is tilted so that the obliquely angled collecting surface is parallel to the ground, the collector is positioned at about the waste, it is somehow manipulated under the waste and then the handle is oriented perpendicular to the ground. With the handle perpendicular to the ground, the collecting surface and pair of sidewall rods retain the waste on the holding surface.

This collector has the disadvantage of being an instrument with an elongated handle whereby force is delivered to the collecting surface by a swinging or "back hoeing" motion of the elongated handle. This delivery of force does not provide leverage to penetrate a resistive medium such a grass and/or results in crude motions without much control. The collector is further disadvantaged by lacking a capability to reduce resistance in penetrating a resistive medium. This collector has the additional disadvantage of lacking any capability to direct or funnel waste onto the collecting surface. The collector is further disadvantaged by a lack of a lighting capability to find waste when used at night.

Known in the art is U.S. Pat. No. 5,741,036 to Ring and entitled "Pet Waste Scoop Assembly." This patent teaches a handheld shovel that is used in connection with a conformed fitting bag to remove waste. The shovel is comprised of a plurality of spaced apart inverted "V" shape fingers that constitute a removing surface. There is a handle that extends retrolinear to the removing surface and is positioned superior to the removing surface. The shovel has the disadvantage of bulky "V" shape fingers that have resistant and drag in passing through grass. The shovel is disadvantaged by force being delivered from a position superior to the removing surface. The shovel is further disadvantage by no capability to direct waste onto the removing surface. The shovel has the disadvantage of lacking a lighting capability to find waste when used at night.

U.S. Pat. No. 6,869,118 to Bradford is entitled "Illuminated Implement Apparatus" and this patent teaches a handheld shovel having two sources of illumination at its marginal edges. In particular, there is a shovel. At the shovel's marginal edges, and superior thereto, there are a pair of tubular supports that run along the marginal edges. At the proximal ends of this pair of tubular supports are lamps. At the dorsal ends of this pair of tubular supports is a transverse tube. At an intermediate position along this transverse tube is a tube that extends retrolinear in the plane of the pair of tubular supports; i.e., superior to the shovel surface. This tube functions as a handle, battery case and switch case.

This apparatus has the disadvantage of projecting a beam of light from a position just superior to the shovel surface in a plane parallel to the surface and not affording top-down lighting. The apparatus has the additional disadvantage of requiring two lights. The apparatus is further disadvantaged by delivery of force from a position superior to the shovel surface.

There exists a need for a utensil for removing solid waste deposited by a dog that does not have a long handle, is strong enough to pass through grass, is as to be able to pick up the solid waste in grass and ameliorates the awkwardness of reaching into the grass.

There exists a need for a utensil for removing solid waste deposited by a dog for use during the darkness of night that provides lighting and ameliorates the awkwardness of holding a flashlight along with the utensil.

There exists a need for a utensil for removing solid waste deposited by a dog that ameliorates the awkwardness of the solid waste sliding away as removal is attempted.

There exists a need for a utensil for removing solid waste deposited by a dog that eliminates the usage of plastic bags and the indirect contacting through a plastic bag of the warm and pliable waste.

There exists a need for a utensil for removing solid waste deposited by a dog that provides for the disposal of that waste in a toilet or commode.

There exists a need for a utensil for removing solid waste deposited by a dog that is easily cleaned and dried.

There exists a need for a utensil for removing solid waste deposited by a dog that is ergonomical.

There exists a need for a utensil for removing solid waste deposited by a dog that is economical to manufacture.

The present invention satisfies these needs, as well as others, and approximately overcomes the presently known deficiencies in the art.

SUMMARY OF THE INVENTION

The present invention is directed to a handheld and illuminated utensil for removing solid waste deposited by a small animal, such as a pet dog.

An object of the present invention is a utensil for removing solid waste deposited by a small animal that does not have a long handle.

An object of the present invention is a utensil for removing solid waste deposited by a small animal that efficaciously delivers force and is ergonomical to use.

An object of the present invention is a utensil for removing solid waste deposited by a small animal that is strong enough to pass through grass so as to be able to get under the solid waste.

An object of the present invention is a utensil for removing solid waste deposited by a small animal that ameliorates the awkwardness of solid waste sliding away as removal is attempted by sliding a surface underneath the waste.

An object of the present invention is a utensil for removing solid waste deposited by a small animal that ameliorates the awkwardness of reaching into the grass.

An object of the present invention is a utensil for removing solid waste deposited by a small animal that is for use during the darkness of night.

An object of the present invention is a utensil for removing solid waste deposited by a small animal that is an all-in-one instrument that ameliorates the awkwardness of holding a separate flashlight.

An object of the present invention is a utensil for removing solid waste deposited by a small animal that eliminates the usage of plastic bags and the indirect contacting through a plastic bag of the warm and pliable waste.

An object of the present invention is a utensil for removing solid waste deposited by a small animal that provides for the disposal of that waste in a toilet or commode.

An object of the present invention is a utensil for removing solid waste deposited by a small animal that is easily cleaned and dried.

An object of the present invention is a utensil for removing solid waste deposited by a small animal that is economical to manufacture.

One aspect of the present invention is a removing utensil for solid waste deposited by a small animal that has an elongated support. From this elongated support, a plurality of elongated members extends that are spaced apart and arranged approximately in a row so as to form a removing surface. The removing surface has first and second side edges and a frontal rake edge. Going from the elongated support to the frontal rake edge defines a forward direction and going from the frontal rake edge to the elongated support defines a rearward direction.

Extending from the elongated support at a positioned superior to the removing surface and in general alignment with the first and second side edges of the removing surface are a pair of elongated members having distal sections that obliquely face away from each other. This pair of elongated members can funnel solid waste unto the removing surface.

The utensil has a handle assembly. This handle assembly is comprised of a handle member that has a length and shape to approximately conform to a grasping hand. There is a means for projecting a beam of light positioned in or about the handle member such that a beam of light is projected in a forward direction. The handle member has the capacity to house a means for powering the means for projecting a beam of light.

There is a bracket having a first leg and a second leg. The first leg extends to the rear of the elongated support and is in about the plane of the removing surface. The second leg extends to connect to the handle assembly which is superior to the removing surface. The bracket is shaped so that a projected beam of light illuminates the removing surface and an area forward of the rake edge of the removing surface.

Another aspect the present invention is a removing utensil for solid waste deposited by a small animal that has an elongated support which is usually either a plate or a block. There is a plurality of prongs that extend from this elongated support that are arranged approximately parallel, spaced apart and in a row along the length of the elongated support so as to form a removing surface. The removing surface has first and second side edges and a frontal rake edge. Going from the elongated support to the frontal rake edge defines a forward direction and going from the frontal rake edge to the elongated support defines a rearward direction.

There is a pair of prongs having distal sections that obliquely face away from each other that extend from the elongated support, are positioned superior to and in general alignment with the first and second side edges of the removing surface and the distal edges are oriented in a plane approximately parallel to the plane of the removing surface. These prongs can funnel solid waste unto the removing surface.

There is a handle member. This handle member has a length and shape that approximately conforms to a grasping hand. The handle member has a front end. At about the front end and approximately housed within the handle member, there is a means for projecting a beam of light in the forward direction. There is a means for powering the means for projecting a beam of light that is housed within the handle member.

There is a bracket having a first leg and a second leg that form an angle between about 20 degrees to about 70 degrees. The first leg extends to the rear of the elongated support in about the plane of the removing surface and is attached at an approximate midpoint along the length of the elongated support. The second leg extends to the handle member. The bracket is configured so that the handle member is superior to the removing surface and the projected beam of light illuminates the removing surface and an area forward of the rake edge of the removing surface.

The previously described versions of the present invention have many advantages which include strong and rigid tongs that can pass through grass, the ability to be easily slid in a resistive medium underneath deposited waste, a means for directing waste onto the removing surface with a reduction of an unwanted side effect of the waste sliding away from and/or rolling off the removing surface, being an all-in-one instrument providing light to locate waste in the darkness, facilitating the complete, or near complete, removal deposited waste, ameliorating the awkwardness of reaching into grass, and being readily cleaned by submerging the operative portion of the utensil in a toilet or commode

BRIEF DESCRIPTION OF THE DRAWINGS

These and other features, aspects and advantages of the present invention will become better understood with reference to the following description, appended claims and accompanying drawings where:

DETAILED DESCRIPTION OF THE INVENTION

Figure 1:
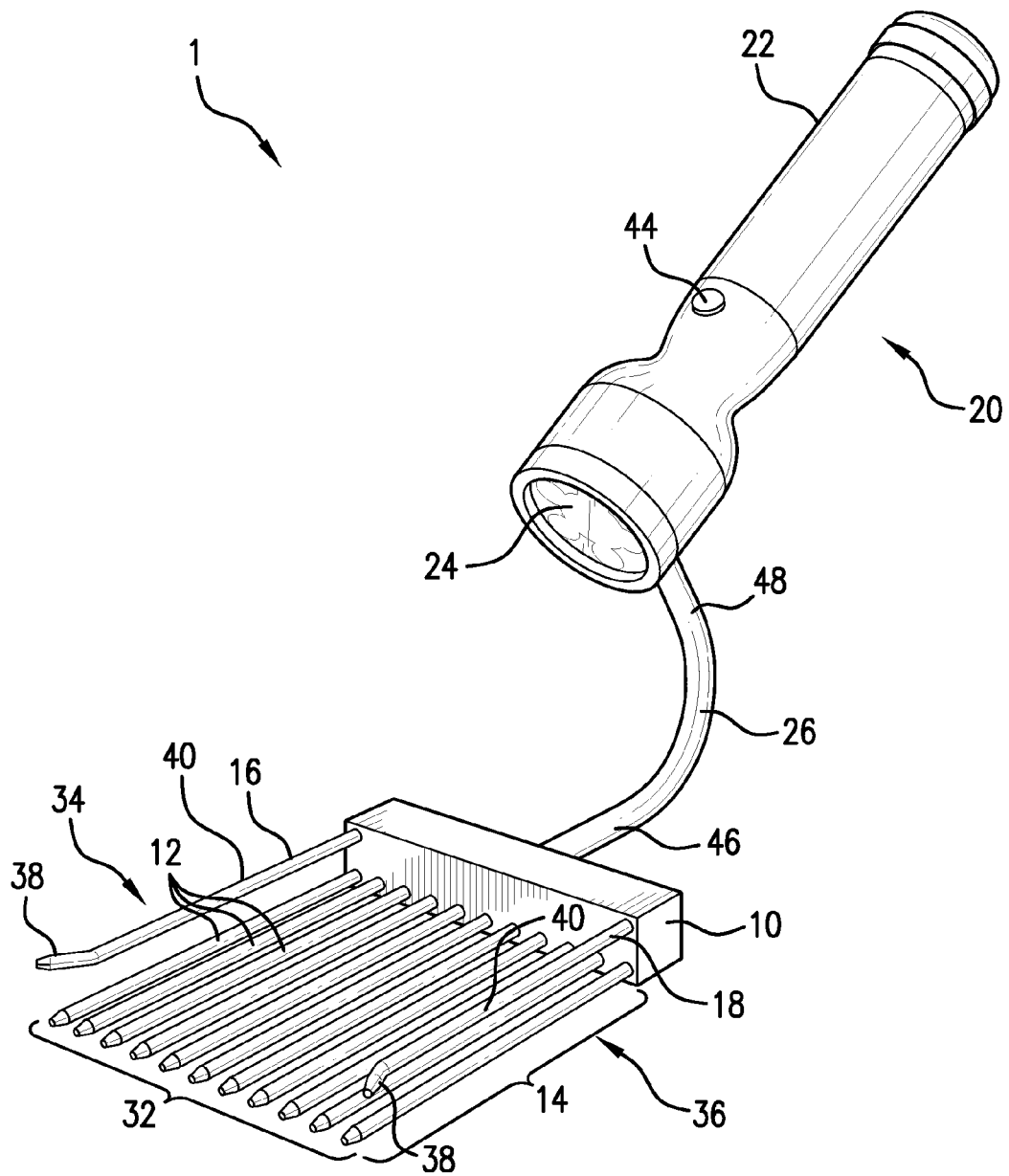
FIG. 1 is perspective view of a removing utensil according to the present invention.

The present invention is described more fully in the following disclosure. In this disclosure, there is a discussion of embodiments of the invention and references to the accompanying drawings in which embodiments of the invention are shown. These specific embodiments are provided so that this invention will be understood by those skilled in the art. This invention is not limited to the specific embodiments set forth herein below and in the drawings. The invention is embodied in many different forms and should be construed as such with reference to the appended claims.

Referring to the drawings collectively, in general terms and for an overview, embodiments of this invention are comprised of the following major components or subassemblies: a support (10); a plurality of elongated members (12) that form a removing surface (14); a pair of elongated members having distal sections that obliquely face away from each other (16, 18) that form a funnel; a handle assembly (20) which is comprised of a handle member (22), a means for projecting a beam of light (24) and a means for powering the means for projecting a beam of light (24) and a bracket (26). In the discussion that follows, each of these major components or subassemblies is discussed, along with other structures in the embodiments of this invention. Thereafter, there is a discussion on how to use the utensil.

Figure 5:
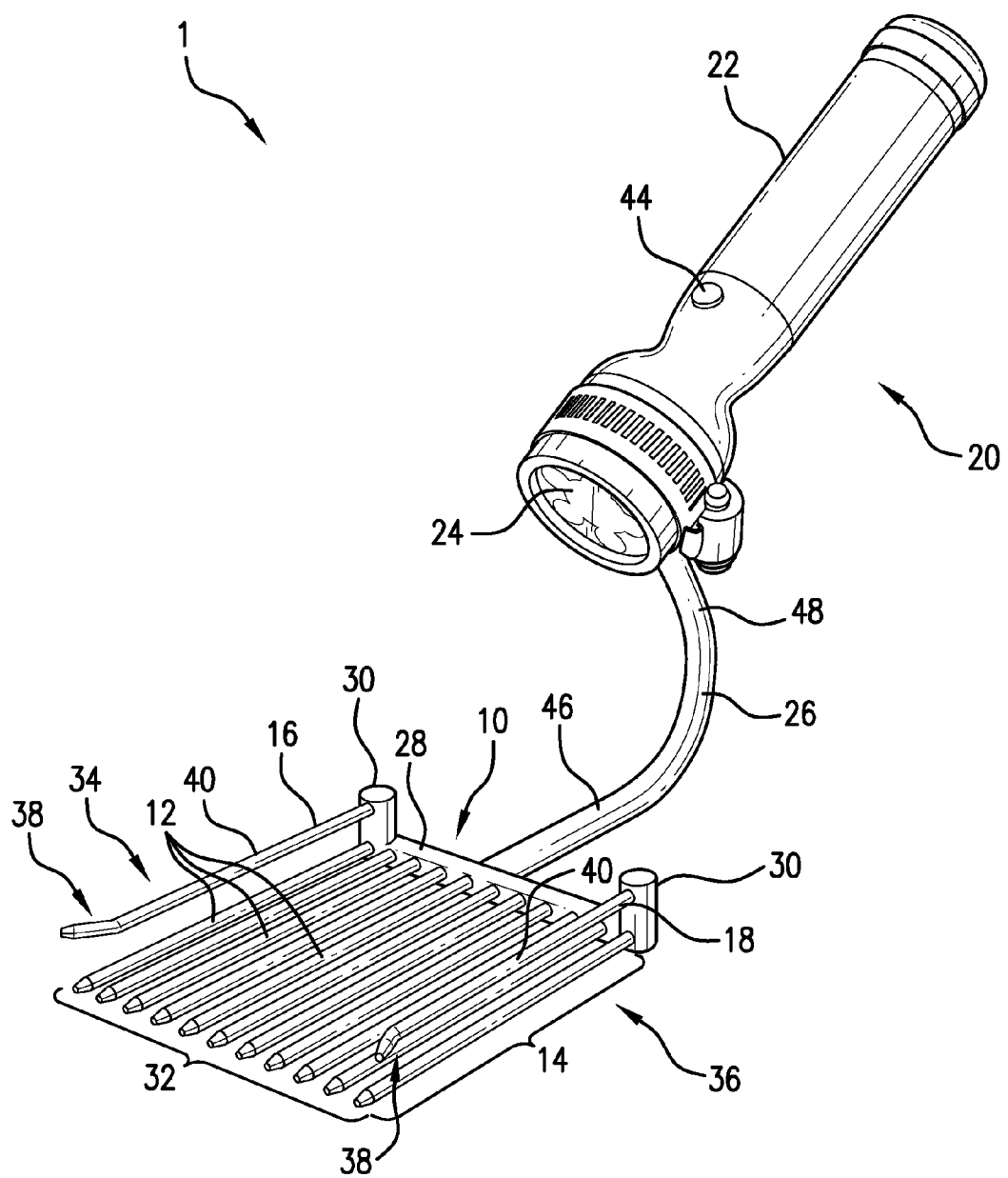
FIG. 5 is perspective view of a removing utensil according to the present invention and FIG. 6 is a top view of a removing utensil according to the present invention.

Referring to FIGS. 1 and 5, the support (10) is a structure or superstructure that bears a plurality of elongated members (12) forming a removing surface (14), a pair of elongated members having distal sections that obliquely face away from each other (16,18) forming a funnel and a bracket (26). Referring to FIG. 1, preferably, the support (10) is an elongated structure having length, height and depth in the form of a rigid plate or a block with a block more preferred. A preferred support is in a block configuration between about 3.250 inches to about 3.750 inches long, about 0.625 inches high and about 0.625 inches in depth. Most preferably, a block shaped support is about 3.260 to 3.290 inches long. Referring to FIG. 5, in the alternative and less preferred, the support (10) is a structure in form of a rod (28) with vertical posts (30) at about its ends.

In an alternative and less preferred embodiment (not illustrated), the support is a superstructure where a portion of the elongated members (12) forming a removing surface (14) serves the dual function of being part of the support (10). In more detail, there is plate, block or rod from which extend a plurality of elongated members (12). Extending off of two of these elongated members (12) are extensions that provide vertical rise which support a pair of elongated members having distal sections that obliquely face away from each other (16,18).

Figure 6:
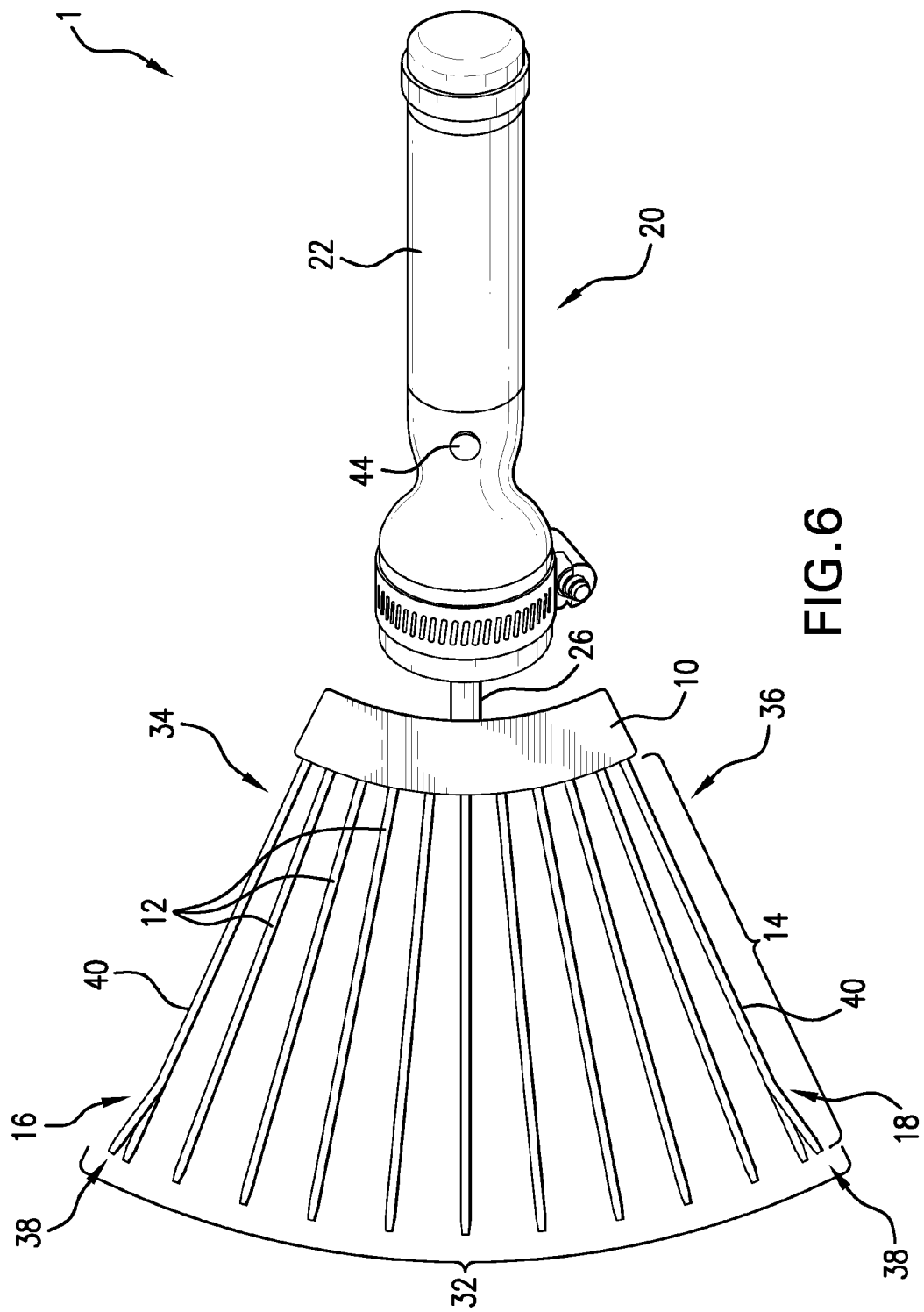

Referring to FIG. 6, in alternative embodiments where the plurality of elongated members (12) forming a removing surface (14) is in a fan configuration, the support (10) is a vertex, vertical post or arcuate member (10) from which the plurality of elongated members (12) extend such that the gap or space between the elongated members increases with the radial distance from the vertex, vertical post or arcuate support (10).

Figure 3:
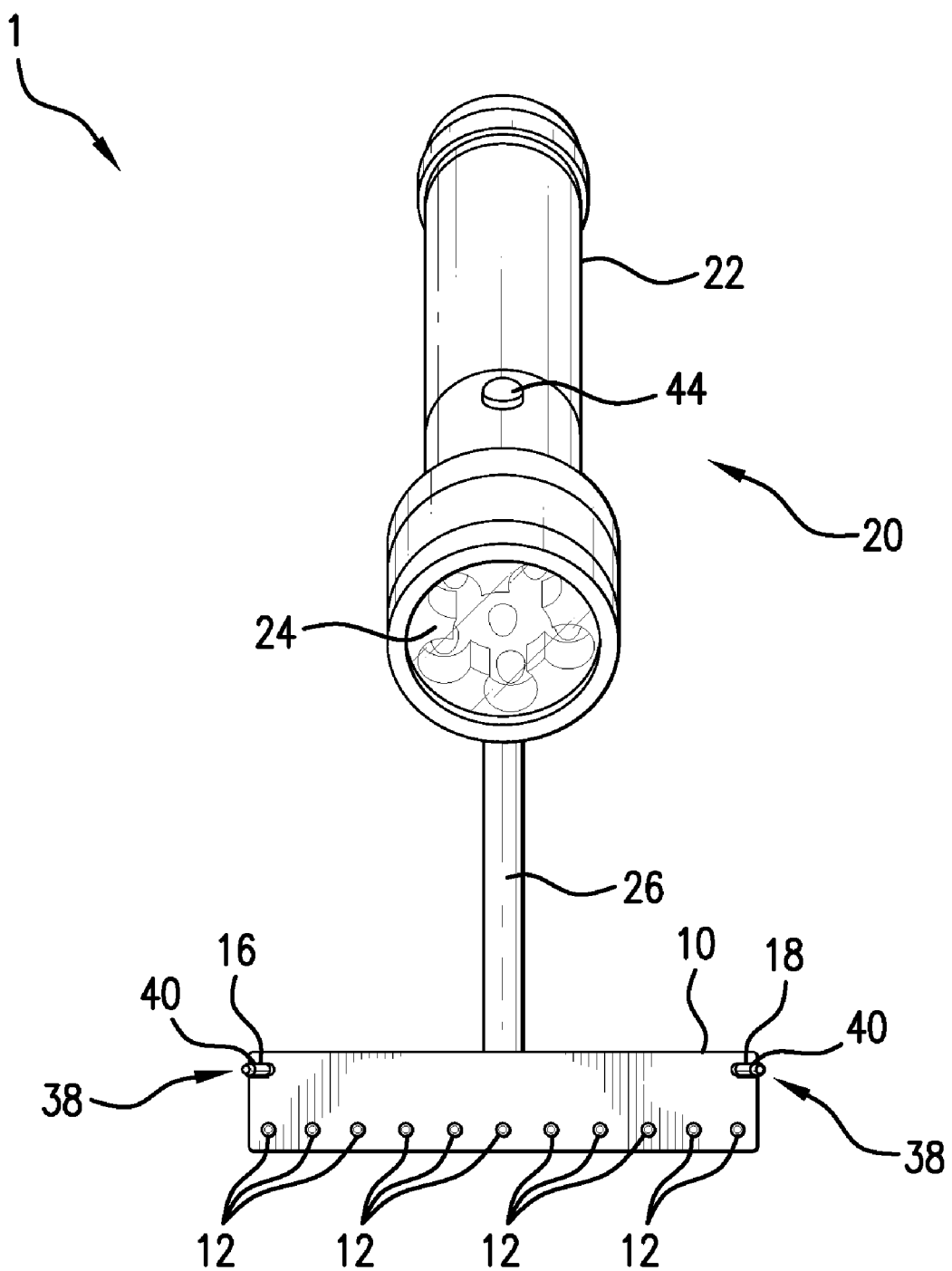
FIG. 3 is a front view of a removing utensil according to the present invention.

Referring to FIGS. 1 and 3, the support (10) can also serve a secondary function of being a back stop for animal waste collected on the removing surface (14). To enhance the ability of the support (10) to retain animal waste on the removing surface (14), its height and/or length can be increased. To enhance the ability of the support (10) to retain animal waste on the removing surface (14), the support (10) can be equipped with a shield to add surface area.

The support is made out of aluminum, stainless steel, other metals or plastic. Aluminum and stainless steel are preferred materials and aluminum is most preferred as being light weight, strong, durable, cleanable and resistant to rusting.

Figure 2:
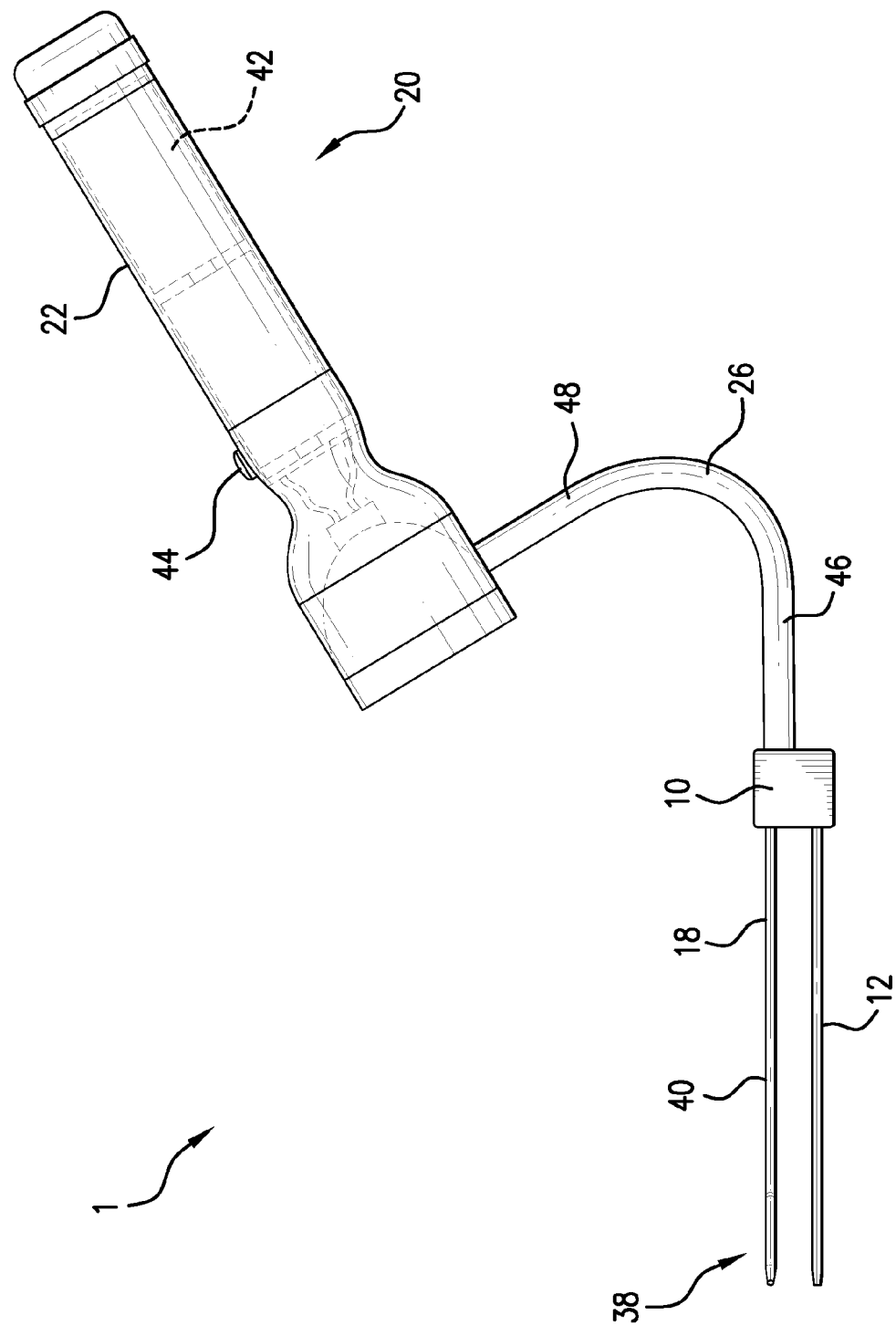
FIG. 2 is side plan view of a removing utensil according to the present invention.
Figure 4:
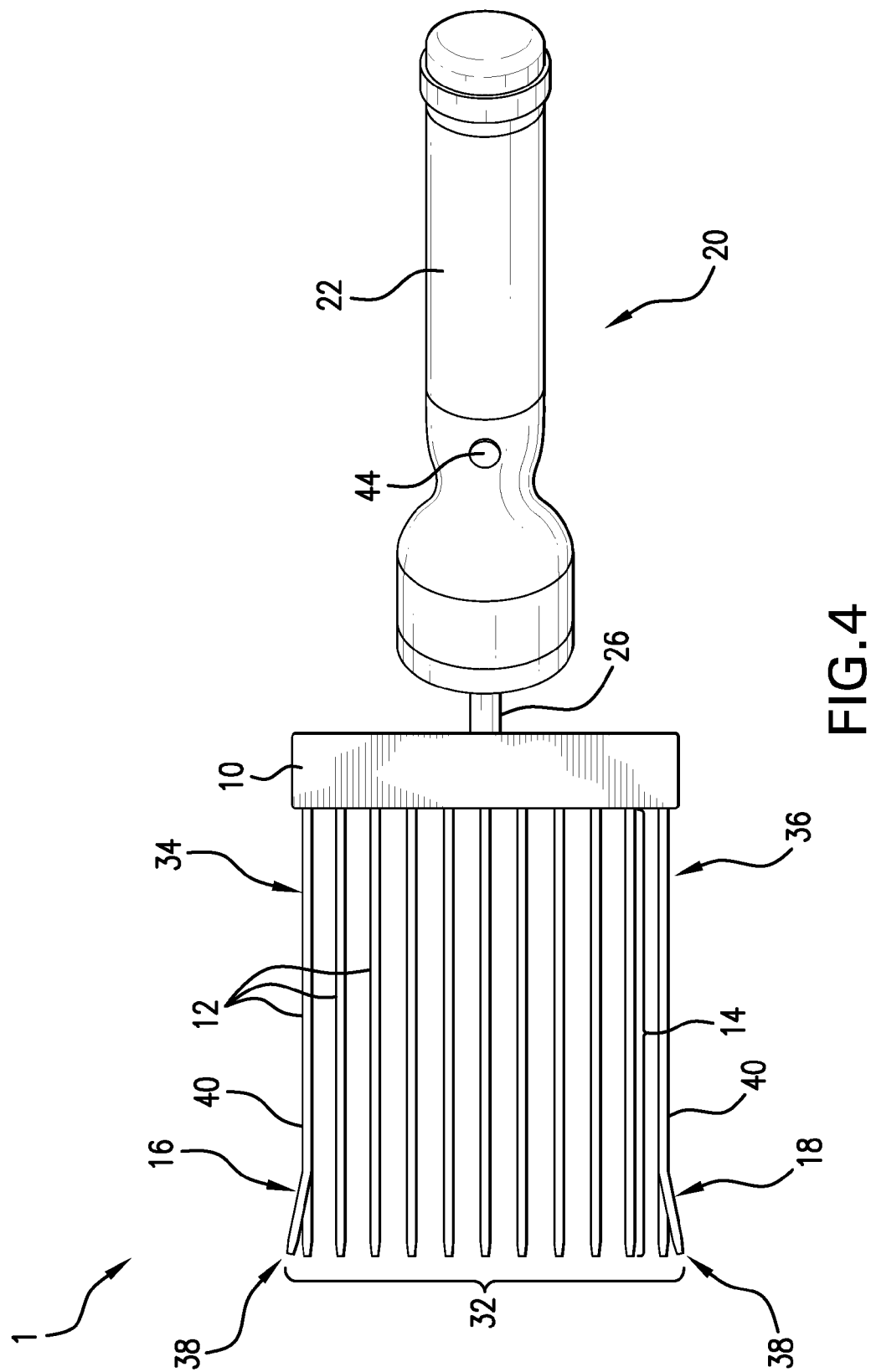
FIG. 4 is a top view of a removing utensil according to the present invention.

Referring to FIGS. 1, 2 and 4, there is plurality of elongated members (12) that form a removing surface. These elongated members (12) are characterized as being long, narrow and sufficiently rigid/strong so as to be able to penetrate through grass without bending or being flimsy. Preferably, the elongated members (12) are rod shaped with a blunt end, a bluntly pointed end or a pointed end. Less preferably, they can be spatula shaped or knife shaped. In a more preferred embodiment, the elongated members (12) are prongs that have a beveled and bluntly pointed ends. Typically, the utensil (1) will be used to remove waste deposited by an animal in grass. A bluntly pointed end facilitates passing the frontal rake edge (32) of the removing surface (14) through the grass to get under the waste without posing the injury risk to a user of a pointed end.

Preferably, the elongated members are between about 3⅞ inches to about 6 inches long and more preferably about 4.25 inches long. Where the elongated members are rods or prongs, preferably, the rods or prongs have a diameter between about 0.0935 inches to about 0.125 inches and a most preferred diameter is 0.0935 inches.

The elongated members (12) are made out of aluminum, stainless steel, other metals or plastic. Stainless steel is preferred materials and stainless steel 316 is most preferred.

Referring to FIGS. 1 and 3, the elongated members (12) extend from the support (10). They can be attached to the support by welding; gluing; insertion into a post hole formed into the support (10) and being held in place in the post hole by friction, gluing, a pin or welding. In a preferred embodiment, the elongated members are attached to a support (10) that is an aluminum block by way of post holes drilled into to block that receive the elongated members (12). The elongated members are held in place by friction that is enhanced punching depressions into the side of the aluminum block adjacent to the inserted elongated members (12) so as to deflect material. In the alternative, the support (10) and elongated members can be molded or formed as an integral unit. This is preferable where the utensil is made from plastic.

Referring to FIGS. 1, 5 and 6, the elongated members (12) can be arranged in any one or a combination of different configuration so as to form a removing surface (14). A preferred arrangement is for the support (10) to be a block or plate having length and for the elongated members (12) to be approximately arranged parallel, spaced apart and in a row along the length of the support (10) so as to form a removing surface (14). An alternative and less preferred arrangement is for the elongated members (12) to be configured in a fan with a plurality of elongated members (12) emanating from a vertex or arcuate support (10). At the vertex or arcuate support (10), the spacing between the elongated members (12) is minimal or zero and the spacing increases with the radial distance from this vertex or arucate support (10).

Referring to FIGS. 4 and 6, the removing surface (14) which is formed has first and second side edges (34, 36) and a frontal rake edge (32). Going from the support (10) to the frontal rake edge (32) defines a forward direction. Going from the frontal rake edge (32) to the support (10) defines a rearward direction.

Referring to FIGS. 4 and 6, the separation or gap of the spaced apart elongated members (12) is preferably sufficiently close that animal waste does not fall though this spacing between the elongated members (12). Generally, the smaller the animal or dog, the smaller the size of the waste left by the animal. Accordingly, the smaller the animal for which the utensil (1) is intended to be used with, the smaller the separation or gap between the elongated members (12). Preferably, elongated members (12) are not spaced closer than that which is needed to retain the waste on the removing surface (14). The closer the spacing, then generally the more elongated members (12) in the utensil (1). Hence, greater weight and/or greater cost.

Referring to FIGS. 3 and 4, in a preferred embodiment where the elongated members (12) are arranged approximately parallel, spaced apart and in a row along the length of an elongated support (10), the separation or gap between the elongated members center to center is preferably a uniform spacing between about 0.250 inches to about 0.500 inches and a more preferably about 0.300 inches.

Referring to FIGS. 1, 4 and 6, the pair of elongated members having distal sections that obliquely face away from each other (16,18) are of the same general character as the elongated members (12) forming a removing surface (14) except for the distal section (38). The distal section (38) is the free section opposite the attachment to the support (10). These distal sections (38) are obliquely angled with respect to the shank (40). Preferably, the oblique angle between the shank (40) and the distal section (38) is between about 135 degrees to about 165 degrees and more preferably, about 150 degrees. They (16,18) are attached to the support (10) in the same manner as described for the elongated members (12) forming a removing surface (14).

Referring to FIGS. 1, 2 and 4, the pair of elongated members having distal sections that obliquely face away from each other (16,18) extend from the support (10) and are positioned superior to and in general alignment with the first and second side edges (34, 36) of the removing surface. In a preferred embodiment, the vertical distance between the elongated members having distal sections that obliquely face away (16, 18) and the removing surface (14) is between about 0.365 inches to about 0.445 inches and more preferably about 0.405 inches. In a more preferred embodiment, the distal sections that obliquely face away from each other (16,18) are oriented in a plane approximately parallel to the plane of the removing surface (14).

Referring to FIGS. 1, 4, and 6, the pair of elongated members having distal sections that obliquely face away from each other (16,18) advantageously perform the function of funneling solid waste unto the removing surface. This enhances the ability of the instrument (1) to capture feces when slid through the grass. It is particularly advantageous where the defecation is firm and rollable.

Referring to FIGS. 1 and 2, the shanks (40) of the pair of elongated members having distal sections that obliquely face away (16, 18) serve as side stops for animal waste collected on the removing surface (14) to help retain animal waste on the removing surface (i.e., not rolling off) while utensil is manipulated to remove the waste from say a grass surface and/or while transporting the waste to a commode or toilet for disposal.

Referring to FIGS. 1 and 3, the handle assembly (20) is comprised of a handle member (22), a means for projecting a beam of light (24) and a means for powering (42) the means for projecting a beam of light (24). The handle member (22) is a structure having a size and shape approximately conformed to a grasping hand. Typically, the handle member (22) is substantially tubular. It can have arcuate edges, finger indentations, finger notches, a textured surface and/or other ergonomic enhancements to better facilitate grasping. The handle member (22) has a front end based on a direction defined by going from the support (10) to the frontal rake edge (32).

Continuing to refer to FIGS. 2 and 4, the handle member (22) can have a cavity to house within it a means for powering (42) a means for projecting a beam of light (24). In a preferred embodiment, the handle member (22) houses the means for powering (42) without altering the handle member's size and shape which is approximately conformed to a grasping hand.

The means for powering (42) has an electrical power source. Structures for the electrical power source are dry cell batteries, wet cell batteries and a fuel cell with a dry cell preferred. The means for powering (42) has components to make contact with terminals of the electric power source and wiring to deliver the power to a means for projecting a beam of light (24). The means for means for powering (42) may include a switch (44). Structures for the switch include slide switches, momentary contact switches, membrane switches, mercury switches and other position sensing switches.

Referring to FIGS. 1, 3 and 5, the means for projecting a beam of light (24) has a light source. Structures for the light source are an incandescent bulb, a florescent bulb, a mercury vapor bulb and light emitting diodes with light emitting diodes being preferred. Optionally, the means for projecting a beam light (24) has a reflecting mirror and/or a lens to focus and intensify the beam.

Continuing to refer to FIGS. 1, 3 and 5, the means for projecting a beam of light (24) is positioned in or about the handle member (22) so that it is aimed in a frontal direction, does not interfere with a user grasping the handle member (22). In an alternative embodiment, there can be a fiber optic cable, slot, channel and/or mirrors to direct or form a channel for the beam of light to pass. In an alternative embodiment, the means for projecting a beam of light (24) can protrude outside the handle member where the size of the protrusion does not interfere with grasping and/or is at a position out of the way of a grasping hand. In a preferred embodiment, the means for projecting a beam of light (24) is housed in the handle member at about the front end.

In a preferred embodiment, the handle assembly (20) is a conventional flashlight where the butt or shank of the flashlight is the handle member (22). The utilization of a conventional flashlight is preferred because of a savings in manufacturing and/or tooling costs. Either a free standing flashlight can be incorporated into an embodiment of the invention or existing molds and tooling for a flashlight can be modified and used for the fabrication of an embodiment of the invention.

Referring to FIGS. 1 and 2, there is a bracket (26) having a first leg (46) and a second leg (48). The bracket (26) can be curved, rounded, "C" shaped, "U" shaped, have a sharp bend and/or "V" shaped. Preferably, the bracket (26) has a polygonal cross-section or circular cross-section with a circular cross-section preferred. The bracket (26) is made out of aluminum, stainless steal, other metals or plastic. Aluminum and stainless steel are preferred materials and stainless steel 304 is a most preferred material.

The first leg (46) extends to the support (10) in about the plane of the removing surface (14). Referring to FIGS. 1, 3 and 4, in a more preferred embodiment, the bracket (26) is attached at an approximate midpoint along the length of an elongated support (10) and extends approximately perpendicularly rearward from the elongated support (10). The bracket (26) can be attached to the support (10) and/or handle member (22) by welding; gluing or insertion into a post hole and being held in place in the post hole by friction, gluing, a pin or welding. Preferably, the first leg (46) leg is inserted into a post hole drilled into an aluminum support (10) where the support (10) is struck along its side adjacent to the post hole to deflect material into the post hole. In the alternative, the bracket (26), support (10) and handle member (22) can be molded or formed as an integral unit. This is preferable where the utensil is made from plastic.

The second leg (48) connects to the handle assembly (20) to position it superior to the removing surface. The bracket (26) can be attached to the handle member (22) by welding, clamping or gluing. In a preferred embodiment where the handle assembly (20) is a conventional flashlight, a pipe clamp can be welded to the bracket (26) and the flashlight secured within the pipe clamp.

The bracket (26) is shaped so that a projected beam of light illuminates the removing surface (14) and an area forward of the frontal rake edge (32). The bracket (26) can be configured so that the illuminated area in front of the rake edge is small or large. The bracket can also be shaped so as to provide a sense of balance to the instrument where the cantilever from the plurality elongated members (12) is balanced by the cantilever from the handle assembly (20). Referring to FIGS. 1, 2 and 5, in a more preferred embodiment, the angle of the bracket (26) between the first leg (46) and the second leg (48) is between about 20 degrees to about 70 degrees. In a more preferred embodiment, said angle is about 30 degrees.

Continuing to refer to FIGS. 1, 2 and 5, preferably, the first leg (46) of the bracket (26) is between about 1 inches and 2 inches long and more preferably about 1⅛ inches long. Preferably, the second leg (48) of the bracket (26) is between about 1 inches and 2.5 inches long and more preferably about 1¾ inches long. Preferably, the total length of the bracket (26) (that is the first leg (46) plus the bend plus the second leg (48) is between about 4¾ inches to about 7 inches long and more preferably about 4¼ inches long. Where the bracket (26) is made from tubular aluminum having a circular cross-section, preferably, the diameter is between about 0.1875 inches to about 0.375 inches and more preferably, about 0.250 inches.

Referring to FIGS. 1, 2 and 3, one of the results of having a bracket (26) with a leg (46) in about the plane of the removing surface (14) is an efficacious delivery of force and/or enhanced leverage to pass and manipulate the utensil (1) through grass and other resistive medium and obstructions.

Continuing to refer to FIGS. 1, 2 and 3, one of the results of having bracket (26) with a second leg (48) projecting a direction superior to the plane of the removing surface (14) is to enhanced leverage and manipulation akin to a longer handle broom style instrument while also providing for the aiming of the projected beam of light to illuminate the removing surface (14) and an area forward of the rake edge (32) of the removing surface and balance to the utensil.

The utensil is used for collecting animal waste, especially from a small dog, and transporting the collected waste for disposal in commode or toilet. The utensil (1) is used by grasping the handle member (22). The user bends or scrunches to the ground in proximity to the deposited waste. The user slides and manipulates the removing surface (14) under the waste. Once the waste is over the removing surface (14), the utensil (1) is lifted up so as to collect the waste on the removing surface (14).

The utensil (1) with waste is transported generally horizontal to a commode or toilet. It is then submerged in the basin and swished around to free the waste from the utensil. The utensils is removed from the commode or toilet and the commode or toilet can be flushed. It might be desirable to wipe the utensil dry.

At night, a user may pan an area with the projected beam and utilize the illumination to locate the feces deposited by the animal. This may done while standing upright or scrunch down. The projected light beam illuminates both the removing surface and the ground in front of the removing surface to facilitate collecting the waste.

The previously described versions of the present invention have many advantages. One advantage is that the instrument is small, compact and easy to manipulate and use. Another advantage is an ability to reach into grass to remove feces. Another advantage is light to find feces on the ground and light to see while removing feces. Another advantage is a funnel to direct feces onto the removing surface. Another advantage is an ability of a user to remove feces by lifting up from the ground. Another advantage is that feces are not behind on the ground. Another advantage is that amelioration of the awkwardness in removing feces. Another advantage is that the instrument can be taken to a commode or toilet and submerged for disposal of feces and cleaning of the instrument. Another advantage is that the instrument can be wiped clean and/or dry.

EXAMPLES

The following examples further describe and demonstrate embodiments within the scope of the present invention. The examples are given solely for the purpose of illustration and are not to be construed as limitations or restrictions of the present invention, as persons skilled in the art will quickly realize many variations thereof are possible that are all within the spirit and scope of the invention.

Example 1

Supports for utensils were constructed from 0.625 inch× 0.625 inch aluminum block that was either 3.260 or 3.290 inches long. A row of 13 holes was drilled into the block with each hole 0.110 inches (measured from the center of the hole) from a first long edge of the block. The first and last holes in the row were spaced 0.125 inches from the short edges of the block and the spacing between the holes (center to center) was 0.300 inches. The diameter of the holes was 0.096 inches. The depth of the holes was either 0.450 or 0.500. In these holes was inserted prongs made from 316 stainless steel having a diameter 0.0935 (3/32) of an inch. Adjacent to each hole along the first long edge of the aluminum, the aluminum block was punched with a blunt punch pin having a diameter of 0.080 inch to deflect material of the aluminum to secure the prong in the block.

Example 2

This is a hypothetical example where utensils where constructed where a row of 13 holes was drilled with each hole drilled at a distance between 0.090 to 0.130 inches (measured from the center of the hole) from a first long edge of an aluminum block having the same dimensions as in Example 1. In these holes were inserted prongs made from 316 stainless steel having a diameter that was between 0.093 inch. to 0.125 inches.

Example 4

An utensil was fabricated by taking stainless steel welding rod having a diameter of 0.0935 inches (3/32 of an inch) as a stock from which to cut elongated members.

Example 5

The fabrication of the utensil from the prior example, where an additional step was performed of electropolishing the welding rod.

Example 6

A bracket having a circular cross-section was attached to a support that was an aluminum block having the dimensions as in Example 1 by way of a post hole. The post hole was drilled 0.215 inches (measured from the center of the hole) from the second long edge of the block and centered at about the midpoint of the second long edge. The diameter of the post hole was 0.250 inches and the depth was 0.500 inches. This diameter was 0.003 inches smaller than the diameter of the bracket. Using a press, the bracket was jammed into the post hole. The aluminum block was punched along the second long edge opposite the post hole with a blunt punch pin having a diameter of 0.080 inch to deflect material of the aluminum to secure the bracket in the block.

Example 7

An utensil was fabricated using ¼ inch diameter SS304 rod as a material for the bracket. The rod was electropolished with a hard chrome surface. A receiving notch was cut into rod to receive a blunt punch indent made in an aluminum support so as to retain the bracket in the support.

Example 8

A dog owner walked a dog a night. The dog made a first deposit of a dropping. The dog then moved forward a short distance and made a second deposit of a second dropping. The user of the utensil actuated the means for projecting a beam of light. Due to the shape of the bracket, the beam of light was cast on the removing surface of the utensil and an area in front of the removing surface, all while the utensil was oriented with the removing surface approximately parallel to the ground. The user proceeded to pick-up the first dropping.

Next, the user maintained the removing surface (14) approximately parallel to the ground and using the beam of light, located the second dropping. Since the shape of the bracket resulted in the beam of light illuminating the ground in front of the rake edge, there was no need to tilt the utensil to shine the light on the ground and the first dropping remained on the removing surface.

Example 9

A dog walker used the utensil to remove defecation. The dog walker took the utensil to a commode, submerged the removing surface into water and swished it around. There were no grooves, crevices or crannies in which defecation was retained. The instrument became clean.

Although the present invention has been described in considerable detail with reference to certain preferred versions thereof, other versions are possible with substituted, varied and/or modified materials and steps are employed. For example, the pair of elongated members having distal sections that obliquely face away from each other can be significantly indexed in over the removing surface and be within the claim. Such a utensil is less effective; notwithstanding, an infringer does not avoid the claims by making an inferior version of the utensil. For another example, the first leg of the bracket can significantly deviate out of the plane of the removing surface and be within the claim. Again, such a utensil is less effective; notwithstanding, an infringer does not avoid the claims by making an inferior version of the utensil. For another example, while the handle has the capacity to house the power means, it does not have to house the power means and it could be placed on say the bracket. Accordingly, these and other possible versions do not depart from the invention. Therefore, the spirit and scope of the appended claims should not be limited to the description of the preferred versions contained herein.

What is claimed is:

1. A removing utensil for solid waste deposited by a small animal comprised of:
   a) a support;
   b) a plurality of elongated members that extend from the support and are arranged spaced apart so as to form a removing surface which has first and second side edges and a frontal rake edge;
   c) a pair of elongated members having distal sections that obliquely face away from each other that extend from the support and are positioned superior to and in general alignment with the first and second side edges of the removing surface whereby solid waste can be funneled unto the removing surface;
   d) a handle assembly comprised of:
      i) a handle member which has a length and shape approximately conformed to a grasping hand;
      ii) a means for powering a means for projecting a beam of light positioned in or about the handle member and
      iii) a means for projecting a beam of light positioned in or about the handle member whereby a beam of light is projected in a frontal direction;
   e) a bracket that has a first leg that extends to the support in a plane of the removing surface and a second leg that connects to the handle assembly which is shaped so that a projected beam of light illuminates the removing surface and an area forward of the rake edge of the removing surface.

2. The removing utensil of claim 1 where the support is an elongated support selected from the group consisting of a plate or a block.

3. The removing utensil of claim 2 where the elongated members are prongs.

4. The removing utensil of claim 3 where the distal sections that obliquely face away from each other are oriented in a plane approximately parallel to a plane of the removing surface.

5. The removing utensil of claim 4 where means for powering is housed in the handle member.

6. The removing utensil of claim 5 where going from the support to the frontal rake edge defines a forward direction, the handle member has a forward end and the means for projecting a beam of light is housed in the handle member at about the forward end.

7. The removing utensil of claim 6 where the first and second legs of the bracket form an angle between about 20 degrees to about 70 degrees.

8. The removing utensil of claim 7 where the first and second legs of the bracket form an angle that is about 30 degrees.

9. A removing utensil for solid waste deposited by a small animal comprised of:
   a) an elongated support;
   b) a plurality of prongs that extend from the support and are approximately arranged parallel, spaced apart and in a row along the length of the elongated support so as to form a removing surface which has first and second side edges and a frontal rake edge, where going from the elongated support to the frontal rake edge defines a forward direction and going from the frontal rake edge to the elongated support defines a rearward direction;
   c) a pair of prongs having distal sections that obliquely face away from each other that extend from the elongated support and are positioned superior to and in general alignment with the first and second side edges of the removing surface whereby solid waste can be funneled unto the removing surface;
   d) a handle assembly comprised of:
      i) a handle member which has a length and shape approximately conformed to a grasping hand and which has the capacity to house a means for powering a means for projecting a beam of light and ii) a means for projecting a beam of light positioned in or about the handle member whereby a beam of light is projected in a frontal direction;

e) a bracket that has a first leg that extends to the elongated support in the plane of the removing surface and a second leg that connects to the handle member which is shaped so that the handle member is superior to the removing surface and the projected beam of light illuminates the removing surface and an area forward of the rake edge of the removing surface.

10. The removing utensil of claim 9 where the elongated support is selected from the group consisting of a plate or a block.

11. The removing utensil of claim 10 where the distal sections that obliquely face away from each other are oriented in a plane approximately parallel to the plane of the removing surface.

12. The removing utensil of claim 11 where the handle member has a front end and the means for projecting a beam of light is housed in the handle member at about the front end.

13. The removing utensil of claim 12 where the bracket is attached at an approximate midpoint of the elongated support.

14. The removing utensil of claim 13 where the first and second legs of the bracket form an angle between about 20 degrees to about 70 degrees.

15. The removing utensil of claim 14 where the first and second legs of the bracket form an angle that is about 30 degrees.

16. A removing utensil for solid waste deposited by a small animal comprised of:

a) an elongated support selected from the group consisting of a plate or a block;

b) a plurality of prongs that extend from the elongated support and are approximately arranged parallel, spaced apart and in a row along the length of the elongated support so as to form a removing surface which has first and second side edges and a frontal rake edge, where going from the elongated support to the frontal rake edge defines a forward direction and going from the frontal rake edge to the elongated support defines a rearward direction;

c) a pair of prongs having distal sections that obliquely face away from each other that extend from the elongated support, are positioned superior to and in general alignment with the first and second side edges of the removing surface and are oriented approximately parallel to the removing surface whereby solid waste can be funneled unto the removing surface;

d) a handle member which has a length and shape approximately conformed to a grasping hand, a front end, a means for projecting a beam of light in the forward direction that is housed within the handle member at about the front end and a means for powering the means for projecting a beam of light that is housed within the handle member and e) a bracket having a first and second leg that form an angle between about 20 degrees to about 70 degrees where the first leg extends to the rear of elongated support in the plane of the removing surface and attaches at an approximate midpoint along the length of the elongated support and the second leg connects to the handle member and is shaped so that the handle member is superior to the removing surface and the projected beam of light illuminates the removing surface and an area forward of the rake edge of the removing surface.

17. The removing utensil of claims 16 where the first and second legs of the bracket form an angle that is about 30 degrees.

* * * * *